(12) United States Patent
Mack

(10) Patent No.: US 8,346,171 B1
(45) Date of Patent: Jan. 1, 2013

(54) REDUCING INTERFERENCE BETWEEN WIRELESS NETWORKS

(75) Inventor: Robert Mack, San Jose, CA (US)

(73) Assignee: Marvell International Ltd. (BM)

( * ) Notice: Subject to any disclaimer, the term of this patent is extended or adjusted under 35 U.S.C. 154(b) by 899 days.

(21) Appl. No.: 12/370,953

(22) Filed: Feb. 13, 2009

Related U.S. Application Data

(60) Provisional application No. 61/029,127, filed on Feb. 15, 2008, provisional application No. 61/029,134, filed on Feb. 15, 2008, provisional application No. 61/029,140, filed on Feb. 15, 2008.

(51) Int. Cl.
*H04B 15/00* (2006.01)
(52) U.S. Cl. ........................................ 455/63.1
(58) Field of Classification Search ............... 455/63.1, 455/67.11
See application file for complete search history.

(56) References Cited

U.S. PATENT DOCUMENTS

| | | | | |
|---|---|---|---|---|
| 7,856,000 B2* | 12/2010 | Ross | | 455/63.1 |
| 7,899,396 B2* | 3/2011 | Meylan et al. | | 455/41.2 |
| 7,945,209 B2* | 5/2011 | Grushkevich et al. | | 455/63.1 |
| 2004/0116075 A1* | 6/2004 | Shoemake et al. | | 455/41.2 |
| 2004/0240404 A1 | 12/2004 | Ibrahim et al. | | |
| 2006/0030265 A1 | 2/2006 | Desai et al. | | |
| 2006/0067321 A1 | 3/2006 | Satou | | |
| 2006/0084383 A1* | 4/2006 | Ibrahim et al. | | 455/41.2 |
| 2006/0133334 A1 | 6/2006 | Ross | | |
| 2006/0274704 A1 | 12/2006 | Desai et al. | | |
| 2007/0060055 A1 | 3/2007 | Desai et al. | | |
| 2007/0223430 A1 | 9/2007 | Desai et al. | | |
| 2008/0080455 A1 | 4/2008 | Rofougaran | | |
| 2008/0123063 A1 | 5/2008 | Matsuoka | | |
| 2008/0123610 A1 | 5/2008 | Desai et al. | | |
| 2008/0192806 A1* | 8/2008 | Wyper et al. | | 375/133 |
| 2008/0318630 A1* | 12/2008 | Gil | | 455/561 |
| 2010/0284380 A1* | 11/2010 | Banerjee et al. | | 370/338 |

\* cited by examiner

*Primary Examiner* — Khanh V Nguyen

(57) ABSTRACT

Devices, systems, methods, and other embodiments associated with reducing interference between wireless networks are described. In one embodiment, a method negotiates wirelessly between a first device and a second device for a quiet interval. The first device and the second device communicate wirelessly via a first network according to a first wireless protocol. The first and second devices are within a wireless area of a second network that communicates with a second wireless protocol. The method controls wireless transmission of data from at least one device on the first network by prohibiting transmissions during the quiet interval. Prohibiting transmissions during the quiet interval creates a reduced interference time period for wireless communications from the second network.

23 Claims, 10 Drawing Sheets

REDUCING INTERFERENCE BETWEEN WIRELESS NETWORKS

CROSS REFERENCE TO RELATED APPLICATIONS

This application claims the benefit of U.S. provisional application Ser. No. 61/029,127, filed on Feb. 15, 2008; U.S. provisional application Ser. No. 61/029,134, filed on Feb. 15, 2008; and U.S. provisional application Ser. No. 61/029,140, filed on Feb. 15, 2008; which are hereby incorporated by reference.

BACKGROUND

Electronic devices such as computers, personal digital assistants (PDAs), cellular telephones, laptops, fax machines, printers, and other devices may include devices that provide both wireless local area network (WLAN) communication and Bluetooth wireless communication. Once communication links are established, WLAN and Bluetooth links share a common frequency spectrum. Both wireless protocols share the same 2.4 GHz radio frequency band. Sharing the same frequency band creates a significant potential for interference. Interference between a Bluetooth link and a WLAN link results in lowered data throughput for both links. One solution to address the interference is to separate a Bluetooth antenna and a WLAN antenna. Bluetooth is a short-range wireless link so the separation may reduce the interference. Interference is reduced to an insignificant level when the Bluetooth and WLAN antennas are more than two meters apart.

Antenna separation is not always possible. The problem of interference is particularly acute in emerging applications such as voice-over-WLAN (VoWLAN) on laptop computers, mobile phones and PDAs, where both Bluetooth and Wi-Fi operate simultaneously in the same device. A better way to reduce Bluetooth and WLAN interference is desired.

SUMMARY

An example embodiment includes a method. The method negotiates wirelessly between a first device and a second device for a quiet interval. The first device and the second device communicate wirelessly via a first network according to a first wireless protocol and are within a wireless area of a second network that communicates with a second wireless protocol. The method controls wireless transmission of data from one device on the first network by prohibiting transmissions during the quiet interval. Prohibiting transmissions during the quiet interval creates a reduced interference time period for wireless communications from the second network.

Another embodiment includes an apparatus. The apparatus comprises negotiation logic to control a wireless communication device. The apparatus controls the wireless communication device to negotiate with a remote device for an asynchronous connectionless (ACL) link boundary associated with an ACL link. The apparatus and the remote device wirelessly communicate via a wireless protocol. The apparatus includes control logic to control wireless communications from the apparatus via the wireless protocol. The control logic controls wireless communication by restricting the apparatus from transmitting data packets that extend across the ACL link boundary.

Another embodiment includes a method. The method reduces interference between a Bluetooth network and a wireless local area network (WLAN). Interference is reduced by generating a packet with a minimal payload data. The method reserves multiple time slots in a Bluetooth wireless network for transmitting the packet. The minimal payload data uses less than the multiple time slots reserved to be transmitted. The method transmits the packet in less time than the multiple time slots. Other Bluetooth devices are prohibited from transmitting data during the reserved multiple time slots thereby creating a transmission free time period for wireless communications from the WLAN.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
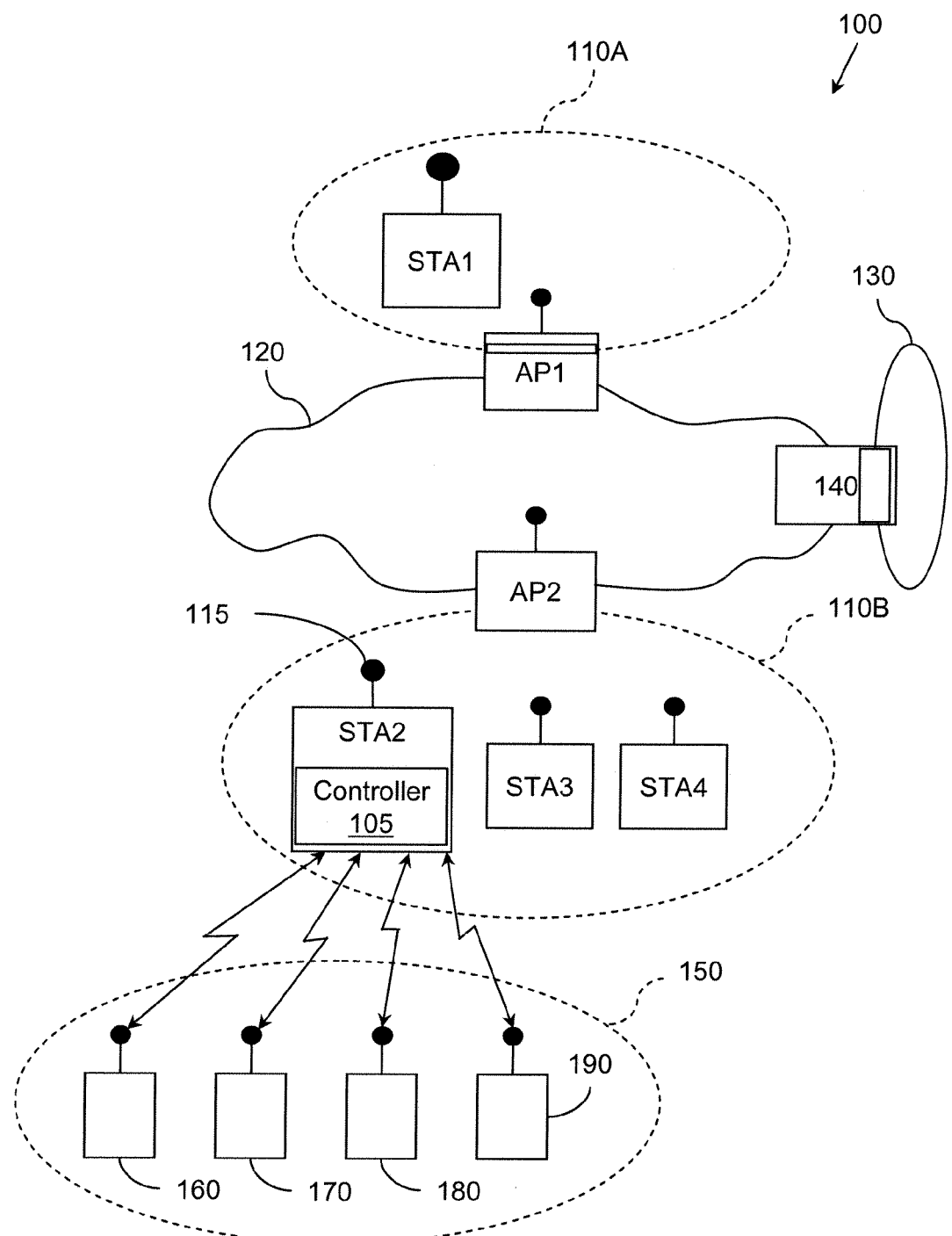
FIG. 1 illustrates one embodiment of a controller in an example network environment.

Described herein are example systems, methods, and other embodiments associated with controlling wireless communications to reduce interference between wireless networks. In one embodiment, an apparatus is provided that controls and/or caused devices in a wireless network to prohibit or delay signal transmissions for during a predetermined time period. While no transmissions are being generated from the wireless network, another different wireless network will be able to transmit data without interference.

In one embodiment, the apparatus implements a Bluetooth wireless communication standard and controls the transmission of Bluetooth packets. The apparatus may operate in an environment where other WLAN devices exist and transmit wireless data on a non-Bluetooth network. For example, the WLAN can conform to an Institute of Electrical and Electronic Engineers (IEEE) 802.11 standard. Thus, there may be interference between the Bluetooth apparatus and the WLAN devices since the 802.11 and Bluetooth standards share the same frequency spectrum. In one embodiment, the present apparatus is configured to independently control the Bluetooth transmissions to provide free time for the WLAN devices without requiring negotiations between a WLAN device and a Bluetooth device. Thus the control and restrictions applied to Bluetooth devices are unknown to the WLAN devices.

In one embodiment, an apparatus is configured to reduce interference between wireless networks. The apparatus operates in a first wireless network in an environment where at least a second wireless network exists. In one embodiment, the apparatus determines that the second network has not transmitted on a wireless medium for a time period. The apparatus then creates quiet zones in the first wireless network without negotiating with devices in the second network. Once a quiet zone is established, the apparatus will not transmit data during the quiet zone and/or will cause other devices in the first wireless network to not transmit data. Thus the quiet zone is a reduced interference time period. The quiet zones allow a device that operates in the second wireless network to transmit wireless data without interference from the apparatus since the apparatus is not transmitting wireless data.

In one embodiment, two Bluetooth devices (e.g. a Bluetooth master and a Bluetooth slave) negotiate for an asynchronous connectionless link (ACL) Bluetooth boundary. The Bluetooth master, Bluetooth slave, and other Bluetooth devices agree to not transmit data that passes the ACL Bluetooth boundary (e.g. will not transmit data packets that will cross a time boundary). Therefore, one or more devices on the Bluetooth network are controlled to not interfere with other wireless networks in the area at the ACL Bluetooth boundary.

In one embodiment, the Bluetooth slave and the Bluetooth master negotiate for a repeating quiet period that repeats at a periodic rate. In another embodiment, the Bluetooth slave may send a message with a minimal payload of data (e.g. one byte of data) in response to a Bluetooth master poll message. In one example, the message is a Bluetooth DH5 message that reserves a predetermined number of (e.g. five) time slots to transmit the message. However, the message is configured to carry a minimal load of data that uses substantially less than the reserved number of time slots (e.g. one or a few bytes of data using one time slot or less than one time slot). No other messages from the Bluetooth network are transmitted during the reserved time slots. Thus the message creates multiple free time slots for another wireless network to transmit data without interference from the Bluetooth network.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation.

Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates a hypothetical networking environment 100 that contains multiple wireless networks. To reduce interference between networks as described previously, a wireless controller 105 is configured to control wireless communications from one network, in one embodiment as summarized above, and as will be described in more detail below. Of course, the networking environment 100 is only for explanatory purposes to describe how the wireless controller 105 operates in certain conditions. It will be appreciated that the controller 105 can be implemented in other network configurations that have at least two different wireless networks in the same area. Details and embodiments of the wireless controller 105 will be described with reference to FIG. 2, apparatus 200, and the other figures as explained herein.

Looking to the example environment 100 in FIG. 1, it includes a WLAN with a first basic service set (BSS) 110A and a second BSS 110B. The first BSS 110A and the second BSS 110B are integrated with a common distribution system 120. The environment 100 can also include a wired network 130, a portal 140, two access points AP1, AP2, and WLAN stations STA1-4. One or more of the stations STA1-4 are, for example, electronic devices configured to communicate wirelessly in the WLAN. The electronic devices can be, but are not limited to, computers, laptops, cellular phone, PDAs, video game consoles, and so on. The stations STA1-4 and access points AP1 and AP2 are shown with transceiver antennas shown as black dots (e.g. like antenna 115). Antenna can be internal or external to their respective device. For exemplary purposes, station STA2 is further configured to provide Bluetooth communication and operate in a Bluetooth network with other Bluetooth devices 150. Thus station STA2 includes two separate transceivers, one configured for Bluetooth communications and one for WLAN communications.

Station STA2 is further configured with the wireless controller 105. Of course, the controller 105 can be implemented in other stations and/or in multiple stations. As previously described, the Bluetooth communications may interfere with the WLAN communications at certain times.

With reference again to the hypothetical network environment 100, additional example elements are described as follows based on typical WLAN and Bluetooth protocols. It will be appreciated that these elements are not part of the controller 105 and are not intended to limit the present disclosure. The first BSS 110A and the second BSS 110B are used represent a fundamental building block of the IEEE 802.11 WLAN architecture and are defined as a group of stations that are under the direct control of a coordination function. For example, station STA1 is under the control of the first BSS 110A. Stations STA2, STA3, and STA4 are under the control of the second BSS 110B. The geographical area covered by a BSS is known as the basic service area (BSA).

In one configuration, the distribution system 120 integrates the first BSS 110A and the second BSS 110B so that data may be passed between the first BSS 110A and the second BSS 110B. The distribution system 120 operates as a backbone network that is responsible for Medium Access Control (MAC) level transport in the environment 100. The distribution system 120, as specified by the IEEE 802.11 standard, is implemented independent of the WLANs that implement the first BSS 110A and the second BSS 110B.

For example, the distribution system 120 can be implemented to be compatible with IEEE 802.3 Ethernet Local Area Network (LAN), IEEE 802.4 token bus LAN, IEEE 802.5 token ring LAN, Fiber Distributed Data Interface (FDDI), Metropolitan Area Network (MAN), or another IEEE 802.11 wireless medium. In one embodiment, the distribution system 120 is implemented to use the same physical medium as either the first BSS 110A or the second BSS 110B. However, the distribution system 120 may be logically different from the first BSS 110A, and may transfer packets between the first BSS 110A and/or transfer packets between the first BSS 110A and the wired network 130.

The wired network is implemented to provide wired networking operations. The wired network 130 may be accessed from the distribution system 120 via a portal 140. The portal 140 integrates IEEE 802.11 signals on the distribution system 120 with non-IEEE 802.11 networks. The portal 140 may also perform the functional operations of a bridge, such as range extension and/or translation between different frame formats, in order to integrate the IEEE 802.11-based networks with other networks.

The access points AP1, AP2 provide the integration points for network connectivity between with the first BSS 110A and the second BSS 110B. The stations STA1-4 correspond to WLAN-enabled terminals implemented with suitable hardware, logic, circuitry, and/or stored software that provide connectivity to the environment 100 via the access points AP1 and/or AP2.

As previously described, station STA2 is Bluetooth enabled. One or more peripheral devices 150 may be part of the Wireless Personal Area Network (WPAN) supported by the station STA2. For example, station STA2 is configured to communicate via Bluetooth technology with a keyboard 160, a PDA 170, a cellular phone 180, and/or a set of headphones 190. In one embodiment, the peripheral devices 150 and the station STA2 form an ad-hoc Bluetooth piconet but, of course, other arrangements of devices can be implemented for a Bluetooth network.

A piconet may be the Bluetooth network or may be a sub-network that is part of a larger Bluetooth network. A scatternet is a network where two or more piconets share one or more devices. A piconet generally includes one master node and one or more slave nodes. A Bluetooth piconet may be implemented with a master device or terminal and up to seven slave devices or terminals. In this example implementation, station STA2 corresponds to the master Bluetooth terminal and the peripheral devices 150 correspond to the slave Bluetooth terminals.

Station STA2 is implemented with a WLAN radio device to allow station STA2 to communicate one or more portions of the environment 100 via access point AP2. In one embodiment, station STA2 is further implemented with a Bluetooth radio device that allows station STA2 to communicate with portions of the environment 100 via a Bluetooth piconet. Having a single device (e.g. station STA2) configured with both a WLAN radio device and a Bluetooth radio device can result in signal interference between the WLAN and Bluetooth communications. In one embodiment, the wireless controller 105 is configured to control Bluetooth transmissions from the Bluetooth radio device of station STA2 to reduce interference with the WLAN network(s).

As an example of interference, if a Bluetooth radio transceiver of station STA2 is receiving a receive (RX) packet and an IEEE 802.11 compatible radio transceiver of station STA2 begins transmitting a transmit (TX) packet, the transmission could interfere with the ability of the Bluetooth radio transceiver to accurately receive the RX packet. Similarly, if the IEEE 802.11 radio transceiver is receiving a packet and the Bluetooth radio transceiver begins transmitting a TX packet, the transmitting by the Bluetooth radio transceiver could interfere with the ability of the IEEE 802.11 compatible radio transceiver to accurately receive the RX packet. In addition, concurrent transmission by both the IEEE 802.11 radio compatible transceiver and the Bluetooth radio transceiver may cause interference in one or both of the transmissions.

Figure 2:
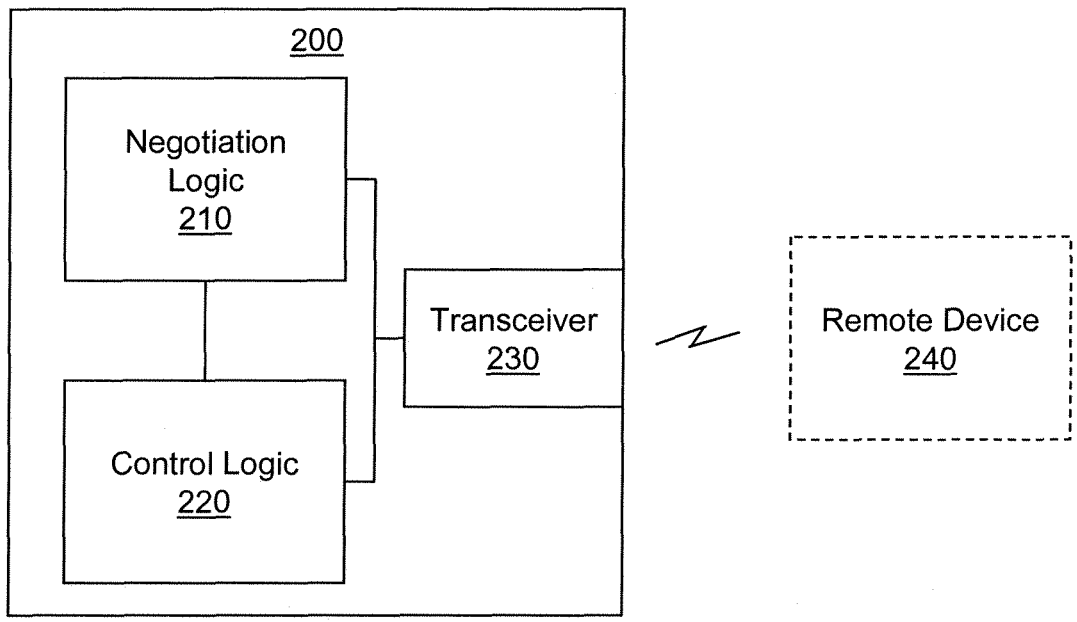
FIG. 2 illustrates an embodiment of an apparatus associated with reducing interference between wireless networks.

FIG. 2 illustrates one embodiment of apparatus 200 configured to control wireless communications to reduce interference between wireless networks as previously explained. The apparatus 200 is one embodiment of the wireless controller 105 of FIG. 1. The apparatus 200 will be described as controlling signal transmissions of one wireless protocol (e.g. Bluetooth) to reduce interference between another network implemented according to a second different wireless protocol (e.g. a wireless local area network (WLAN)). It will be appreciated that in other embodiments (e.g. FIG. 4), the apparatus 200 can be configured to provide wireless communications according to two or more different protocols.

In one embodiment, the apparatus 200 is implemented in or coupled to a Bluetooth chip. The Bluetooth chip is a board level component that can be built into an electronic device or part of a separate card/component and connected to an electronic device. The Bluetooth chip is a set of micro-miniaturized electronic circuits fabricated on semiconductor material. The Bluetooth chip includes a radio transceiver 230 configured to communicate wireless signals compatible with Bluetooth. Of course, as the Bluetooth protocol changes over time, the apparatus 200, the transceiver 230 and/or other components can be modified to comply with future versions of Bluetooth. It will be appreciated that apparatus 200 can be configured to be compatible with other wireless protocols to control signal transmissions as described herein. In the present embodiment, the apparatus 200 will be described as controlling Bluetooth communications.

In one embodiment, suppose that a Bluetooth wireless link has been established between the apparatus 200 (or a device that apparatus 200 is within) and a compatible remote Bluetooth device 240. In the presence of other wireless networks, the Bluetooth signals can interfere with other network signals as previously described.

With continued reference to FIG. 2, in one embodiment, the apparatus 200 includes negotiation logic 210 and control logic 220. The negotiation logic 210 is configured to negotiate with the remote device 240 for a link boundary of the wireless link. The link boundary is selected and stored as a control parameter. Using the link boundary, the control logic 220 is configured to restrict the transmission of data from the Bluetooth radio 230 connected to the apparatus 200. Transmissions of data are restricted by the control logic 220 so that data is transmitted on one side of the link boundary and controlled so that the data does not extend across the link boundary.

In one embodiment, the control logic 220 is configured to split a packet into smaller packets if the packet is too large and will cross the link boundary. A packet that may cross the link boundary may be broken up into smaller packets. One of the small packets is sent before the link boundary and the other smaller packet is sent after the link boundary so that no data is transmitted across the link boundary.

In one embodiment, the control function of the control logic 220 includes identifying and selecting packets to be transmitted in a different order. For example, packets waiting to be transmitted are selected that have a size such that when transmitted at a particular point in time will not be still transmitting across the link boundary. Thus smaller sized packets are selected as the link boundary approaches the current time.

In another embodiment, the negotiation logic 210 further causes the remote device 240 to set parameters for the link boundary so that the remote device 240 also complies with the transmission restrictions. The remote device 240 can include similar control logic 220 to control its transmissions. By restricting Bluetooth transmissions according to the link boundary, a reduced interference time period is created after the link boundary. Thus there are no Bluetooth transmissions to interfere with devices operating in other wireless networks (e.g. WLAN devices).

In one embodiment, the link boundary may be negotiated between a Bluetooth master or a Bluetooth slave. An example Bluetooth network can be as follows. In a piconet, a station may take on the role of either a Bluetooth master or a Bluetooth slave. A station may also act as a Bluetooth master and simultaneously as a Bluetooth slave in more than one piconet. However according to Bluetooth protocol, a station can be a master in only one piconet. The Bluetooth master typically controls the network traffic in a piconet. A Bluetooth slave is controlled by one Bluetooth master and acts as a client node. A piconet may host several slaves simultaneously. Thus in one embodiment, the apparatus 200 is configured to function as a Bluetooth master. The negotiation logic 210 negotiates with the remote device 240 that is a Bluetooth slave or other slave devices.

Data is transferred in a Bluetooth system over two major types of links. The major link types are synchronous connection oriented (SCO) links and asynchronous connectionless (ACL) links. In one embodiment, the link boundary is generated to correspond to an ACL link boundary. An SCO link in a typical Bluetooth system may use time division to achieve a bidirectional link between a master and a slave.

Bluetooth packets may be various sizes. The Bluetooth packet size may occupy, for example, 1, 3, or 5 slots. An SCO link is one slot, an ACL link is 1, 3, or 5 slots, and an eSCO link is 1 or 3 slots. In one example, one slot is 0.625 milliseconds wide. SCO slots of an SCO link are typically used for voice applications. Packets associated with an SCO link may be carried periodically, for example, in every slot, in every second slot, or in every third slot.

In contrast to an SCO link, an ACL link carries traffic on a dedicated logical link. An ACL link is not necessarily associated with a circuit that switches between communication channels. In order to control bandwidth utilization on a Bluetooth piconet, a Bluetooth master may control data flow on a communication channel by polling slaves for every data packet sent on the channel in an uplink direction from the Bluetooth slave to the Bluetooth master. Traffic on SCO links is generally sent on an uplink without polling, whereas polling is performed on ACL links. In the downlink direction from the Bluetooth master to the Bluetooth slave, no polling is generally required to send a packet because Bluetooth slaves are normally idle unless being polled.

In one embodiment, the negotiation logic 210 negotiates for an ACL link boundary associated with an ACL link. The link boundary restricts data transmissions so that the data transmissions do not extend across the ACL link boundary. Restricting the transmissions from the Bluetooth network (e.g. a first wireless protocol), at least partially, reduces interference with another network (e.g. a second wireless protocol). The ACL link boundary is also beneficial to the Bluetooth network when an SCO link is enabled because this boundary may allow the throughput of ACL data to be improved. In one embodiment, the negotiation logic 210 is configured to initiate negotiation with the remote device 240 proactively before there is interference between the first wireless protocol and the second wireless protocol. Once a link boundary is set, the apparatus 200 transmits the link boundary parameters to the master and/or other devices associated with the first wireless protocol. The master and/or other devices are then caused to implement the link boundary to control their packet transmissions according to the link boundary, which is implemented via their respective control logic 220.

In another embodiment, the apparatus 200 and the remote device 240 agree to set the ACL link boundary at a specific Bluetooth clock value. The agreed upon Bluetooth clock value associated with the ACL link boundary is then sent to other devices in a Bluetooth piconet. The other piconet devices are instructed to generate and set the ACL link boundary as a transmission control parameter and thus are caused to control data transmission as discussed based on in part the agreed upon Bluetooth clock value.

The Bluetooth time is tracked by the piconet devices with internal timers. According to Bluetooth protocol, the internal timers are synchronized during connecting to the network (e.g. page connect). When the slave receives a packet, the slave updates its internal timer so that the internal timer matches a master time. The piconet devices then update their internal timers with the Bluetooth time. Since other devices on the Bluetooth piconet network have synchronized time clocks, the ACL link boundary will occur at nearly the same time for all the piconet devices.

Interference is reduced by restricting the apparatus 200 to transmit data on an ACL transmit side and not across the ACL link boundary. The control logic 220 controls packet transmissions so that a packet is does not cross the ACL link boundary. The ACL link boundary allows the network implementing the second wireless protocol to have time after the ACL link boundary to transmit data without interference from the first wireless protocol. In one embodiment, assuring that data packet does not extend across the ACL link boundary preserves a WLAN beacon time without requiring Bluetooth frame padding.

In order to assure that transmission does not occur beyond the ACL link boundary in another embodiment, firmware or hardware in the apparatus 200 is configured to calculate how much time is left from the current time until the ACL link boundary point. The apparatus 200 can include or read an internal timer implemented in hardware that keeps track of the current time. For example, the current time can be a global time that other devices in the first wireless protocol track. The global time is used to synchronize the devices in the first wireless protocol. Firmware may subtract the current time from a time the ACL link boundary is to occur to calculate an amount of remaining time until the ACL link boundary. The Bluetooth clock has a time increment of 0.5 time slots. Therefore, a simple subtraction will calculate how many time slots are remaining before the link boundary. The remaining time until the next ACL link boundary is used by the control logic 220 and/or other firmware to identify and schedule packets for transmission that are small enough to complete transmission during the remaining time (e.g. complete before the ACL link boundary).

In another embodiment, the negotiation logic 210 is configured to negotiate for the ACL link boundary through the Bluetooth link management protocol (LMP) layer. For example, the negotiation logic 210 and/or the control logic 220 is implemented with firmware and/or executable commands programmed into the Bluetooth LMP command list to provide the functionality as described or similar equivalents.

Figure 3:
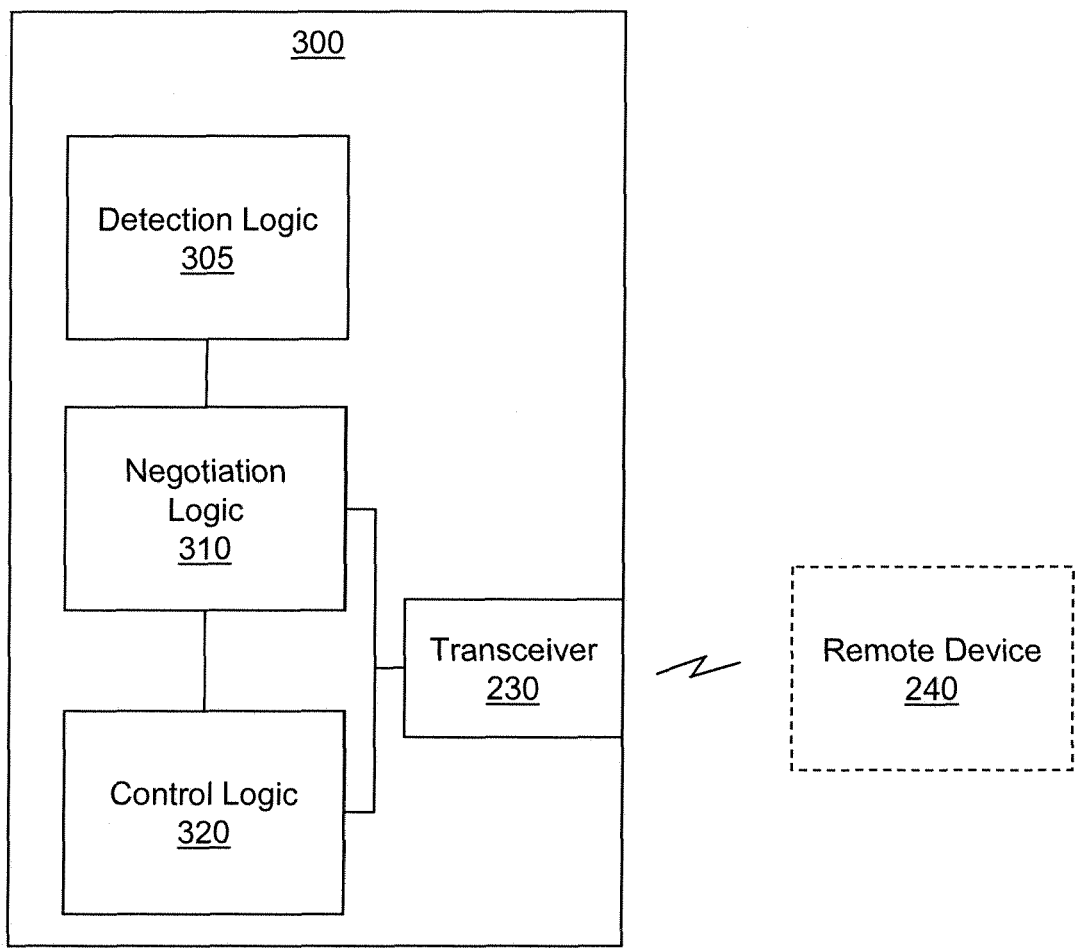
FIG. 3 illustrates another embodiment of an apparatus associated with reducing interference between wireless networks.

FIG. 3 illustrates one embodiment of an apparatus 300 associated with reducing interference between wireless networks. The apparatus 300 is another embodiment of apparatus 200 shown in FIG. 2 and includes detection logic 305. Negotiation logic 310, control logic 320, and transceiver 230 correspond to the same or similar components of as in FIG. 2 with the differences explained below. As in FIG. 2, the following example will be described where the apparatus 300 controls transmissions of a first network (e.g. Bluetooth communications) to reduce interference with a different second network (e.g. WLAN).

In one embodiment, the detection logic 305 is configured to detect when data has not been transmitted by the second network in a time period. For example, the detection logic 305 is configured to detect that data has not been transmitted by decoding packet headers from packets received by the transceiver 230 (or another transceiver connected to the apparatus 300). The time period may be a sliding window of time. When no data is transmitted by the other network during the sliding window, the detection logic 305 will detect the lack of transmissions and determine that the other network has not transmitted data. In other embodiments, the detection logic 305 will look for network transmissions at periodic intervals. If there are no network transmissions in a threshold level of periodic intervals, then the detection logic 305 determines that the network has not transmitted data for the time period. The detection logic 305 then sets a parameter and/or generates a signal indicating this condition. In response, the negotiation logic 310 is implemented to initiate negotiations with other remote devices 240 to set a quiet time (e.g. a transmission free zone).

The negotiation may be performed through the Bluetooth link management protocol. In some embodiments, the negotiation logic 310 negotiates for more than one quiet time and the quiet time may be a periodic quiet time. The quiet time(s) are stored as transmission control parameters.

The control logic 320 is configured to control apparatus 300 to transmit data using the first wireless protocol at times other than the quiet time. In other words, the control logic 320 restricts or otherwise prohibits data packets to be transmitted from the transceiver 230 during the quiet time as defined by its transmission control parameter. In one example, the quiet period is periodic and will be repeated until the negotiation logic 310 negotiates with the remote device 240 for the quiet period to be discontinued. Likewise, control parameters defining the quiet time are transmitted and/or stored in other remote devices on the network causing the other devices to also comply with the transmission restrictions. Providing a transmission free time zone from one wireless network allows another wireless network to transmit data without interference.

In another embodiment, the apparatus 300 is configured to preserve a Bluetooth SCO and/or a Bluetooth enhanced SCO (eSCO) instance. The eSCO instance is the time that a Bluetooth device enters eSCO mode. The eSCO instance is preserved because the quiet time will not interfere with the eSCO instance. Bluetooth devices in eSCO mode have enhanced voice data packet error correction capabilities. In Bluetooth eSCO mode, error-checking voice channels allow the retransmission of corrupted voice data that is later corrected. Bluetooth eSCO packets have a cyclic redundancy check (CRC) allowing the receiver to check that packets are received correctly.

Figure 4:
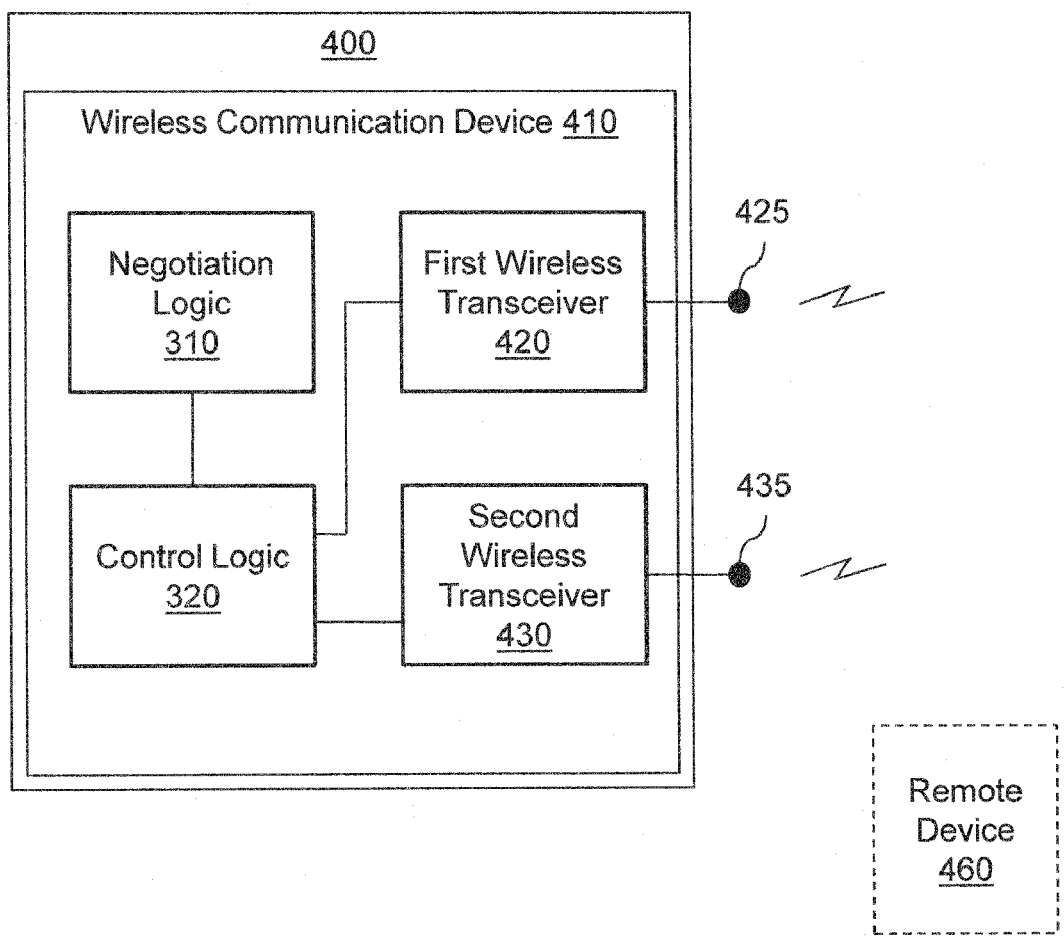
FIG. 4 illustrates another embodiment of an apparatus associated with reducing interference between wireless networks.

FIG. 4 illustrates one embodiment of an apparatus 400 associated with reducing interference between wireless networks. The apparatus 400 is another embodiment of apparatus 300 shown in FIG. 3. Negotiation logic 310 and control logic 320 are the same or similar to the corresponding components in FIG. 3.

The apparatus 400 is implemented with a wireless communication device 410 that comprises a first wireless transceiver 420 and a second wireless transceiver 430. The first wireless transceiver 420 and the second wireless transceiver 430 are implemented with antennas (425, 435), modulators, amplifiers, filters, and/or other components for providing wireless communication according to a wireless communication protocol.

The first wireless transceiver 420 is configured to transmit and receive data according to a first wireless protocol and thus communicates with a first wireless network. The second wireless transceiver 430 is configured to transmit and receive data according to a second wireless protocol and thus communicates with a second wireless network that is different from the first network. The first and second transceivers 420, 430 operate independent from each other and allow the apparatus 400 to be in communication to the two different wireless networks concurrently.

In one embodiment, the first wireless protocol is a Bluetooth protocol and the second wireless protocol is an IEEE 802.11 protocol or another WLAN protocol. As previously explained, since the two different transceivers (and thus the communication networks) function independently from each other, a potential for signal interference from one network to the other can occur. The apparatus 400 is configured to reduce interference by controlling the transmission of Bluetooth data at times other than during a determined quiet time and prohibiting data transmission during the quiet time (as previously discussed). By prohibiting Bluetooth transmissions during the predetermined period, the WLAN transceiver is free to transmit data without interference from Bluetooth signals.

In one embodiment, the wireless communication device 410 is a single chip implemented with both transceivers 420 and 430. For example, the first wireless transceiver 420 is a Bluetooth compatible transceiver and the second wireless transceiver 430 is an IEEE 802.11 compatible transceiver. Thus wireless communication device 410 is a dual transceiver chip. In one embodiment, apparatus 400 is an electronic device (e.g. computer, printer, cell phone, video game console, and so on) that includes and/or is operably connected to the wireless communication device 410. During operation, in one embodiment, the apparatus 400 can be functioning as a Bluetooth slave or a Bluetooth master once the apparatus 400 is communicating in a Bluetooth network.

The wireless communication device 410 is implemented with negotiation logic 310 and control logic 320. As discussed under FIG. 3, the negotiation logic 310 negotiates with a remote device 460 for a quiet time (e.g. a transmission free zone). The quiet time is implemented for the first wireless transceiver 420 and controlled by the control logic 320. In another embodiment, the negotiation logic 310 negotiates for one quiet time or more than one quiet time. The negotiation can be implemented and performed as described above.

The control logic 320 then controls data transmissions from the first wireless transceiver 420 so that data is not transmitted during the quiet time. Thus transmissions that would have occurred during the quiet time are delayed until after the quiet time ends. In another embodiment as discussed under FIG. 2, the control logic 320 can be configured to schedule data packets so that no transmission of a packet extends into the quiet time even though it can begin transmission before the quiet time. As previously explained, the control logic 320 is configured to calculate whether there is adequate transmit time available to send a packet of data so that the packet transmission does not extend into the quiet time. By providing a controlled transmission free zone from one network, other networks can communicate with reduced interference.

Figure 5:
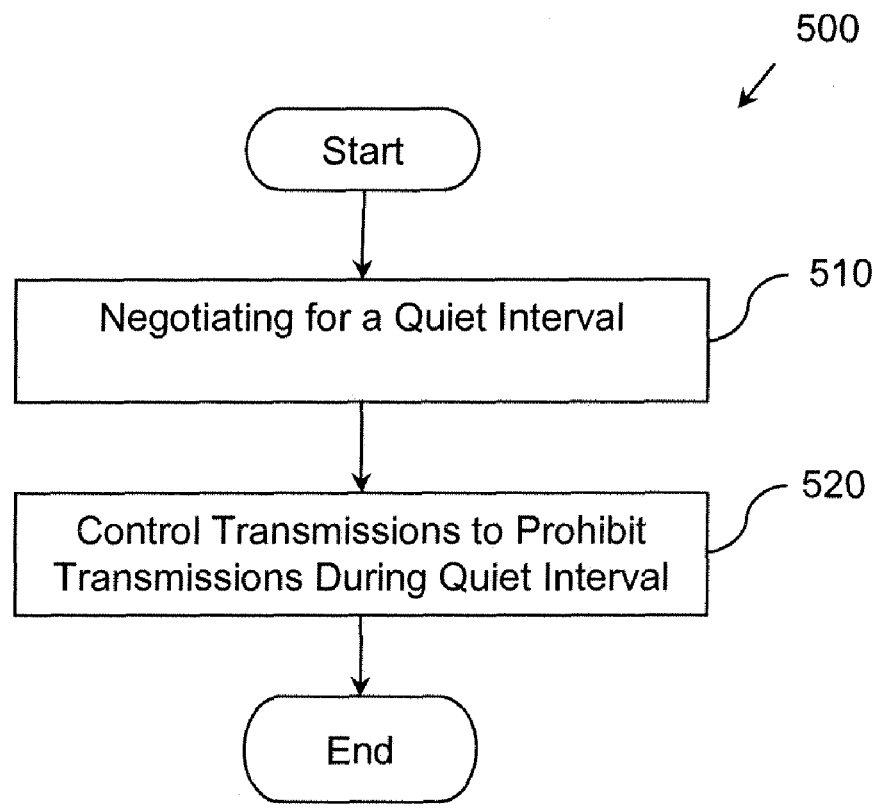
FIG. 5 illustrates one embodiment of a method associated with reducing interference between wireless networks.

FIG. 5 illustrates an embodiment of a method 500 associated with controlling wireless transmissions to reduce interference between two wireless networks. As previously described, the method 500 is implemented to reduce interference between a first network implementing a first wireless protocol and a second network implementing a second different wireless protocol. For example, transmissions from the first wireless protocol are controlled and restricted from being sent during a periodic quiet interval.

Once initiated, the method 500 negotiates, at 510, for a quiet interval with one or more other devices within wireless communication. The quiet interval is an interval of time that devices in the first network will not access a wireless medium. In one embodiment, the quiet interval is determined based in part on a Bluetooth BD_CLOCK period. In one embodiment, the negotiating, at 510, may be between a master device and a slave device as explained previously. The quiet interval is determined that repeats at a periodic rate. The quiet interval is then stored and set as a transmission control parameter to control wireless transmissions.

After the quiet interval is set, wireless transmissions of the first wireless protocol are controlled based at least in part on the quiet interval so that no data packets are transmitted during the quiet interval (block 520). This can include determining that the quiet interval is currently active and rescheduling or delaying packets from being transmitted until the quiet interval expires.

In another embodiment, transmissions are controlled at 520 by sending data packets from one device on the network over an asynchronous connectionless (ACL) link at times other than during the quiet interval. By prohibiting or rescheduling packet transmissions around the quiet interval, communications from the first network will not interfere with the second network during the quiet interval. In another embodiment, transmissions are controlled based at least in part on the beginning boundary of the quiet interval. For example as previously explained, data packets are control to not extend into the quiet interval even though the packet could be transmitted before the quiet interval start.

The quiet interval may also be called an "inverted sniffing interval" that is periodic. For example, a device on a wireless network will periodically sniff a wireless medium to determine if there are packets for the device. At predetermined time slots, the device will wake up and "sniff" the network to determine if there are packets addressed to the device. At other "non-sniff" times, the device would save power by turning off unused receivers, transmitters, and other circuits not needed to wake up the device for the next "sniff". If there was a packet available for the device, a network controller will send the device a packet instructing the device to wake up and begin receiving packets. Sniffing prolongs the battery life of handheld devices. The quiet interval may be regarded as an "inverted sniffing interval" because the device is not really going to sleep but rather is letting another wireless device (e.g. implementing the second wireless protocol) access the wireless medium without interference from itself.

In another embodiment, the negotiation, at 510, may be performed at different networking protocol stack layers. For example, the negotiation is performed through a Bluetooth Link Management Protocol (LMP) layer. The negotiation may be performed by a local device with a remote wireless device as previously discussed.

In one embodiment, the first network is a Bluetooth network and the first wireless protocol is the Bluetooth protocol. The master is a Bluetooth master and the slave is a Bluetooth slave. The second network is a WLAN and the second wireless protocol is compatible with an IEEE 802.11 standard. Therefore, the interference is reduced by creating interference free times for the WLAN devices to transmit data when the Bluetooth devices stop their transmissions during the quiet interval.

In another embodiment, a Bluetooth device (e.g. a master) is configured to negotiate for a quiet interval that corresponds to a beacon period of the WLAN. During the beacon period, the WLAN sends out a control packet to WLAN devices associated with the WLAN or that may enter the WLAN medium. If WLAN devices do not detect a threshold number of beacon messages due to interference by the Bluetooth network, the WLAN devices will consider a connection with the WLAN medium to be lost. To avoid interference with the beacon period, the master will request values of the beacon period and a beacon interval from the WLAN. The quiet interval is then set to the beacon period and will repeat at the beacon interval. The master then sends the beacon period and interval to other Bluetooth slaves associated with the master to cause the slaves to control and restrict their transmissions to comply with the beacon period and the beacon interval.

In some embodiments, an integrated circuit and/or chip is implemented to perform the method 500. The chip may be a dual transceiver chip as in FIG. 4. It will be appreciated that method 500 can be implemented to perform at least some of the operations or combinations of operations that apparatuses 200, 300, and 400 (FIGS. 2, 3, and 4, respectively) perform. In another embodiment, the method 500 can be implemented in firmware in an electronic device. The same applies to other methods discussed herein and their equivalents.

Figure 6:
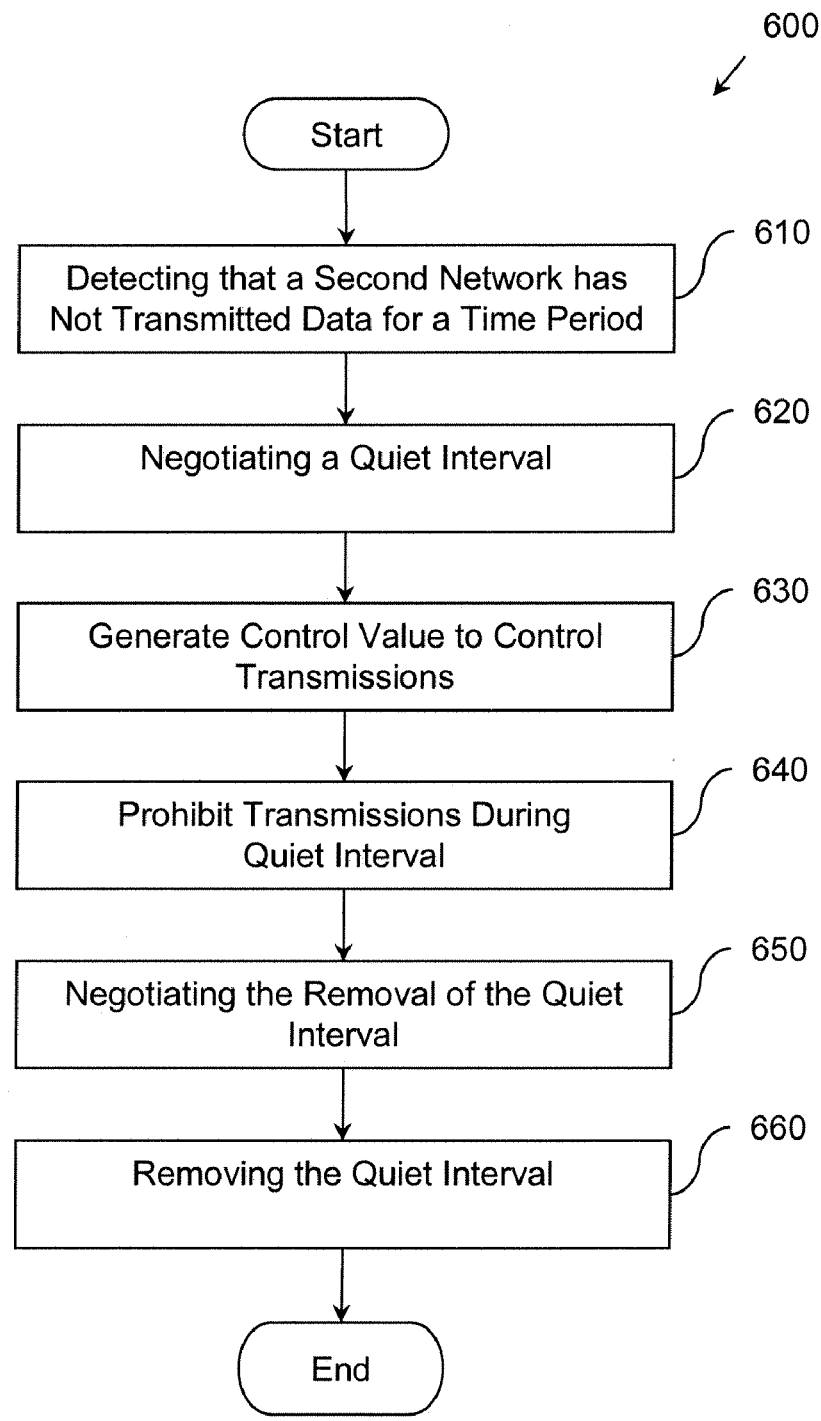
FIG. 6 illustrates another embodiment of a method associated with reducing interference between wireless networks.

FIG. 6 illustrates an embodiment of a method 600 for controlling wireless transmissions to reduce interference between two wireless networks. The method will be described with reference to the previous example where a first network exists that operates according to a first wireless protocol and a second network exists that operates according to a second wireless protocol. The area of the networks overlap and thus can cause interference. The method 600 improves reducing interference by delaying or otherwise prohibiting data transmissions on one wireless network during a periodic quiet interval.

The method 600 detects, at 610, that the second network has not transmitted data for a time period. The detecting operation can include monitoring network traffic from the second network to determine a lack of transmissions. For example, the detecting can include determining whether a control beacon packet has been received during a threshold number of beacon intervals. When no control beacon packet is received for the threshold number of beacon intervals, the method assumes that the second network has not transmitted data for a time period.

In response to detecting no data transmissions, the method 600 initiates control actions to limit wireless transmissions of the first network. For example, the method negotiates, at 620, a quiet interval with at least one other device on the first network. The quiet interval is similar to the quiet interval of method 500 described above and is negotiated in a similar manner. A control value representing a length of the quiet interval is generated and stored at 630 and, in one embodiment corresponds to a beacon time. The length is stored for example by writing the value in a register or a memory location. The length is used as a control parameter at least in part to control wireless transmissions over the first network during the quiet interval by prohibiting transmissions.

The method 600 transmits data, at 640, over an ACL link in the first network where the data is transmitted outside the quiet interval and data is not transmitted during the quiet interval. During the quiet interval, the first network will not interfere with communications from the second network. In other embodiment as previously described, data packets can be scheduled so as to not extend into the quiet interval even though the data packet could be transmitted before the quiet interval.

The method 600 negotiates, at 650, between the master and the slave for the removal of the quiet interval. The negotiation may be performed through a Bluetooth Link Management Protocol (LMP). The quiet interval is removed, at 660. Thereafter, the master and the slave devices in the first network are caused to remove the quiet interval. The method 600 may repeat the quiet interval subsequently if it is later detected that the second network has not transmitted data for another time period.

Figure 7:
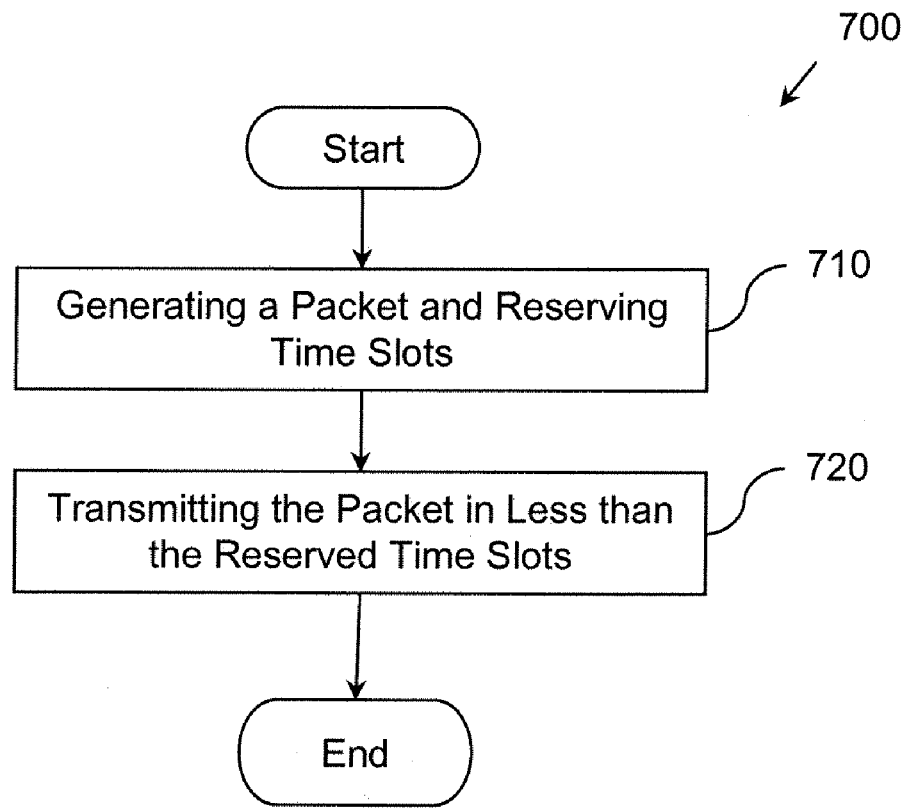
FIG. 7 illustrates another embodiment of a method associated with reducing interference between wireless networks.

FIG. 7 illustrates another embodiment of a method 700 associated with controlling data transmission by reserving a number of time slots but only transmitted data during a small portion of the slots. Thus time period is created where no data transmissions occur similar to the previous quiet time.

The method 700 generates, at 710, a packet that reserves a number of time slots in the wireless medium. In one embodiment, the packet is a Bluetooth data high 5 (DH5) packet that that reserves the wireless medium for five time slots. During the reserved time period, other Bluetooth devices will not transmit on the wireless medium. The packet is generated to carry a minimal load of data that uses substantially less than the reserved five time slots (e.g. carry one or a few bytes of data using one or less full time slots). In one embodiment, the minimal load is dummy data simply used to reserve the time slots.

The packet is then transmitted at 720. The data transmission completes in less time than the reserved time period thereby creating multiple free time slots for another wireless network to transmit data without interference from the Bluetooth network.

In one embodiment, the packet is generated, at 710, in response to detecting no WLAN activity on the wireless medium for a time period. How to detect the WLAN activity on a wireless medium is discussed below with reference to FIG. 9.

Therefore, wireless interference is reduced during the free time slots. Even when the packet completes the transmission of its entire data load in the first reserved time slot, the other Bluetooth devices on the network will not try to transmit data on the remaining four time slots. Other Bluetooth devices will not transmit during the reserved five time slots because information in the packet header indicates that the packet needs five time slots for transmission. With no Bluetooth activity on the wireless medium for the remaining time slots, a transmission free period is established and the WLAN will have reduced interference from the Bluetooth network for the remaining slots. Of course, the foregoing example can be implemented using other numbers of time slots.

In another embodiment, the packet is transmitted at 720 in the Bluetooth network in response to receiving an initial poll message from a Bluetooth master. In one example, a Bluetooth slave transmits the packet in a time slot after a Bluetooth master sends a polling message. In one example, the Bluetooth slave generates the packet and transmits the packet.

Figure 8:
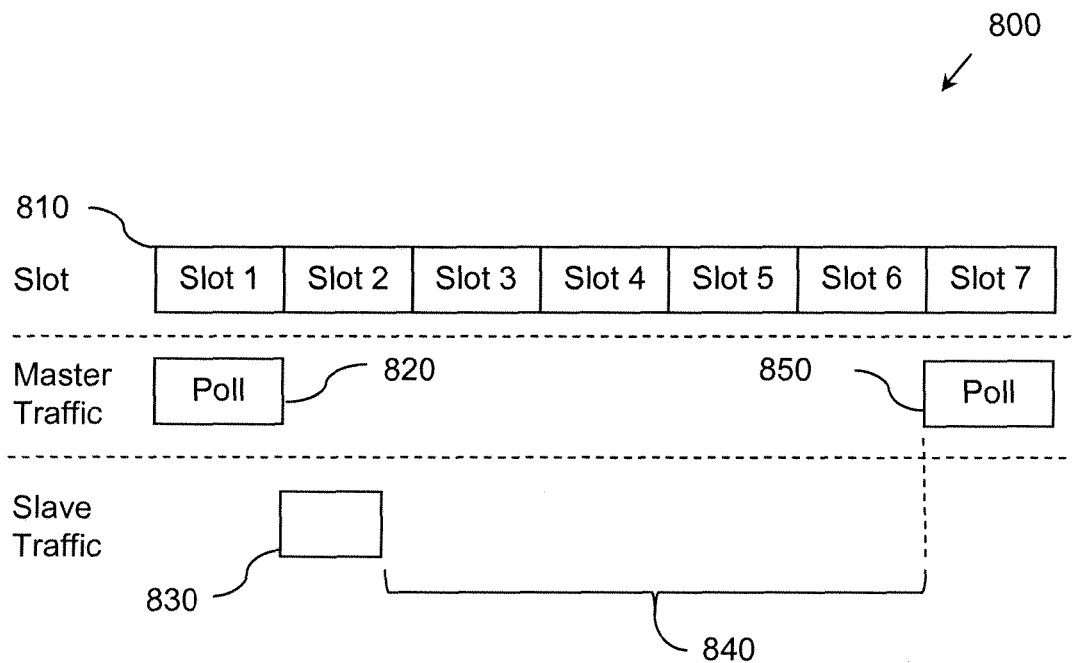
FIG. 8 illustrates an example timing sequence associated with reducing interference between wireless networks.

FIG. 8 shows one example of a Bluetooth master and slave communication timing sequence 800. The master and slave transmit data on an asynchronous connectionless (ACL) link 810 with seven time slots. The master sends a poll message 820 to the slave. The slave generates and transmits a packet 830 to reduce interference as discussed under FIG. 7. The packet is generated in slot 2 and reserved multiple slots (e.g. slots 2-6). The data transmission completes before the end of slot 2 because the packet contains a minimum amount of payload data (e.g. one byte).

A Bluetooth master may poll Bluetooth slaves with a suitable polling algorithm. For example, the Bluetooth master may poll using a round robin polling algorithm. The round robin polling represents a simple way of polling slaves in a piconet. Round robin polls slave nodes in sequence according to a circular list.

During polling contact by a master node, a slave node may be allowed to send one or more packets of a size that may be fixed at 1, 3, or 5 time slots. The Bluetooth master may poll a different Bluetooth slave when a polled Bluetooth slave does not respond to a poll in a subsequent time slot after the poll by the Bluetooth master. Polling algorithms such as exhaustive polling and gated polling may also be used.

With this in mind, another embodiment of the method 700 in FIG. 7 can include an action (after block 720) of delaying subsequent packets from being transmitted until a subsequent poll message is received from the Bluetooth master. The WLAN transmits data without Bluetooth network interference for a time period between transmitting the packet and receiving the subsequent poll message. In one embodiment, the time period is at least four Bluetooth time slots. The time period may be about 2.9 milliseconds. The time period is shown as a range 840 in FIG. 8. The range 840 spans from before the end of slot 2 to the beginning of slot 7 where a subsequent poll message 850 is sent. Those of ordinary skill in the art will realize that other time periods of different durations may also be created.

In one embodiment, method 700 is implemented in a device that contains a Bluetooth transceiver and a WLAN transceiver. The WLAN may contain a WLAN queue of data to be transmitted. A packet with a minimal payload (e.g. one byte of payload) is generated and transmitted by the Bluetooth transceiver as discussed above, when the WLAN queue has data to transmit. After the packet is transmitted, the WLAN will have about four interference free times slots to start draining the queue by transmitting data out. At a subsequent master poll message, the device will check to see if the WLAN queue is empty. If not, another packet with a minimal payload data is generated and the process repeats until the WLAN queue is emptied.

Figure 9:
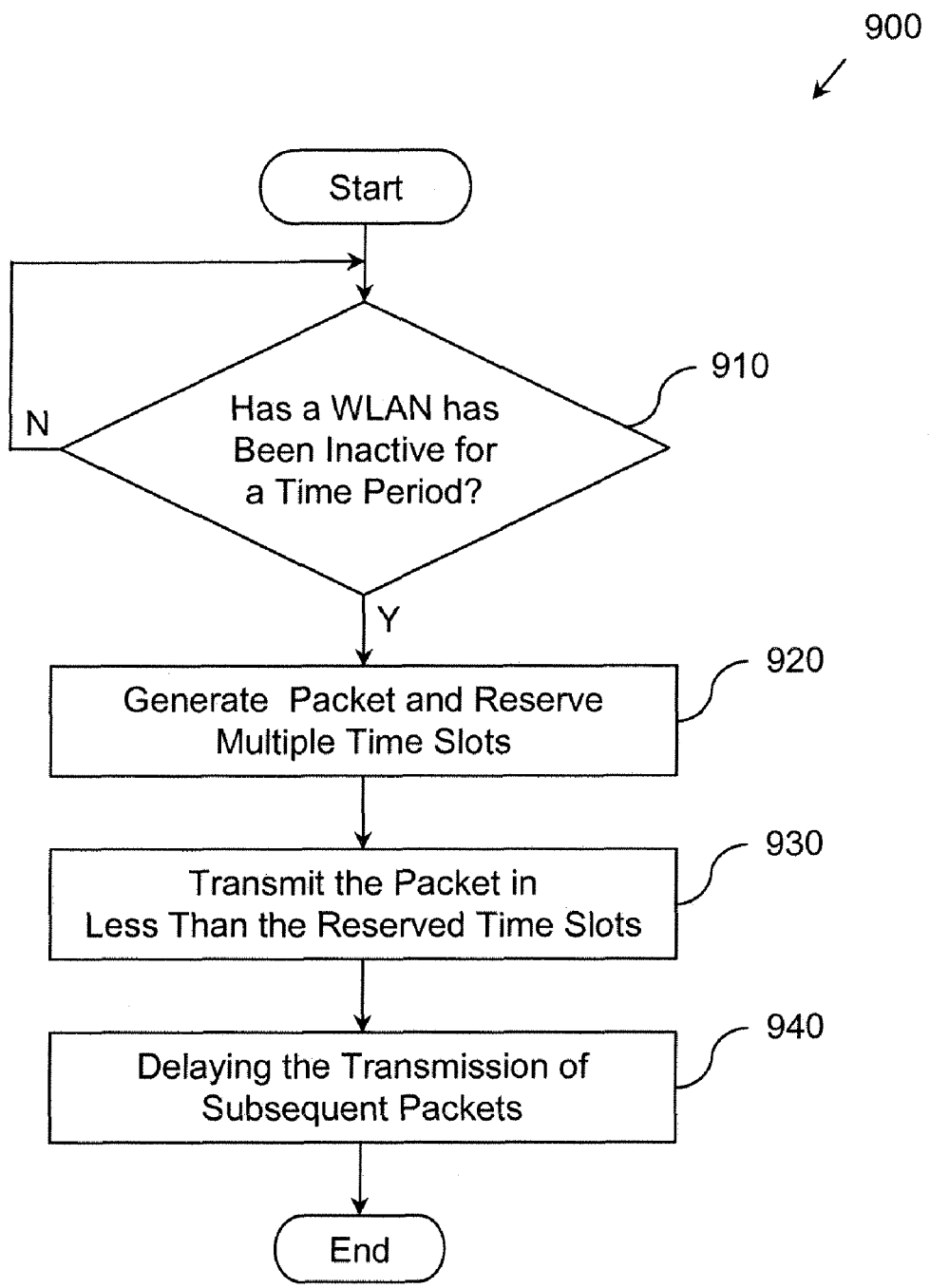
FIG. 9 illustrates another embodiment of a method associated with reducing interference between wireless networks.

FIG. 9 illustrates an embodiment of a method 900 associated with reducing interference between two wireless networks. The method 900 reduces interference between a Bluetooth network and a WLAN by controlling a transmitter to transmit and not to transmit on the Bluetooth network during selected time periods. During the time period when the transmitter is not transmitting on the Bluetooth network, a transmitter can transmit on the WLAN.

The method 900 determines, at 910, if a WLAN has been inactive for a time period. For example, wireless traffic is monitored on a wireless medium to detect whether the WLAN has not transmitted data for a time period. In one embodiment, the monitoring is performed by a Bluetooth device. The method 900 determines, at 910, that a WLAN has been inactive for a time period. In another example, if no control beacon packets are received from the WLAN for a threshold number of WLAN beacon intervals, the Bluetooth network will determined that the WLAN has been inactive for the time period.

In response to detecting that the WLAN has not transmitted data for the time period, the method 900 generates a packet at 920. The packet may be generated by a Bluetooth slave in response to receiving a Bluetooth master pole message. The packet generated will reserve a wireless medium, which is shared by the Bluetooth network and the WLAN, for multiple time slots (e.g. five time slots). Even though five slots are reserved, the packet will finish being transmitted by the first time slot as discussed with reference to FIGS. 7 and 8.

The method 900 transmits the packet at 930. A packet header of the packet is configured to reserve five time slots for transmitting the packet. In one embodiment, the packet is a Bluetooth DH5 packet that contains one byte of payload. Other Bluetooth devices will read the header and not transmit data during the reserved time slots. The packet completes transmission in a first time slot after receiving an initial poll message from a Bluetooth master. A WLAN may access the wireless medium without interference from the Bluetooth network for the four reserved slots after the packet is transmitted.

The method 900 delays transmitting subsequent packets in the Bluetooth network at 940. The subsequent packets are delayed until a subsequent poll message is received from the Bluetooth master. The Bluetooth master device and slave devices will decode the packet transmitted at 930. The Bluetooth devices will determine that the packet has reserved 5 times slots. However, the packet completes transmission in less than the reserved time slots (e.g. in one or less time slots). Accordingly free space is created and WLAN devices have access to the WLAN after the packet completes transmission because no other Bluetooth data packets are being transmitted during the remaining time slots.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits.

Figure 10:
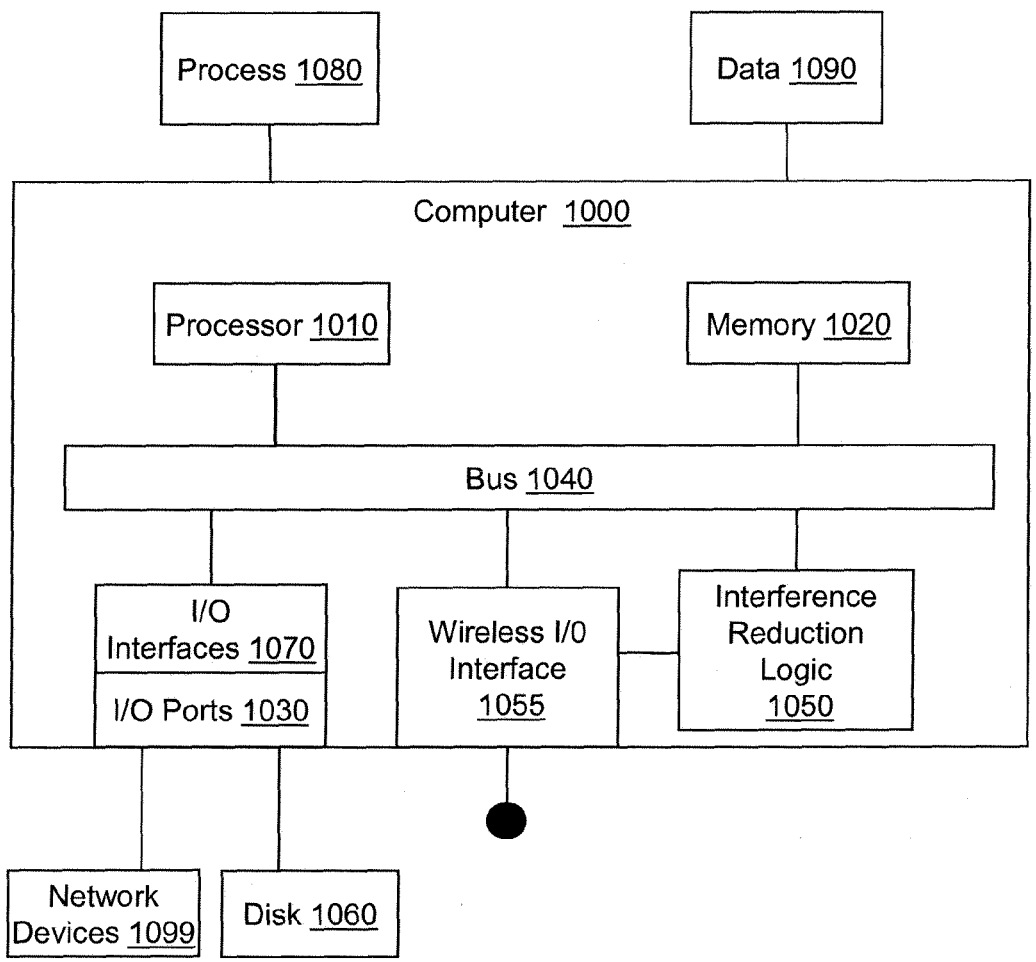
FIG. 10 illustrates an embodiment of a computing environment in which example systems and methods, and equivalents associated with reducing interference between wireless networks may operate.

FIG. 10 illustrates an example electronic device (e.g. computer 1000) in which example systems and methods described herein, and equivalents, are implemented. The example computer 1000 is implemented with a processor 1010, a memory 1020, and input/output ports 1030 operably connected by a bus 1040. In one example, the computer 1000 includes interference reduction logic 1050 to reduce interference between two wireless networks.

The interference reduction logic 1050 provides means (e.g., hardware, stored software, firmware) to selectively control a wireless I/O interface 1055 to control wireless transmissions in order to create a quiet time as previously described. The quiet time allows another wireless system access to a wireless medium without interference from the computer 1000. The interference reduction logic 1050 can be implemented similar to the apparatus 200, 300, 400, and/or combinations of their features. The interference reduction logic 1050 can include logic implemented, for example, as an ASIC or other type of circuit.

Generally describing an example configuration of the computer 1000, the processor 1010 may be a variety of various processors including dual microprocessor and other multi-processor architectures. A memory 1020 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 1060 may be operably connected to the computer 1000 via, for example, through an input/output interface (e.g., card, device) 1070 and the input/output port 1030. The disk 1060 may be, for example, a magnetic disk drive, a solid state disk drive, a floppy disk drive, a tape drive, a Zip drive, a flash memory card, a memory stick, and so on. Furthermore, the disk 1060 may be a compact disk read-only memory (CD-ROM) drive, a compact disk recordable (CD-R) drive, a compact disk rewritable (CD-RW) drive, a digital video disk read-only memory (DVD ROM), and so on. The memory 1020 can store a process 1080 and/or a data 1090, for example. The disk 1060 and/or the memory 1020 can store an operating system that controls and allocates resources of the computer 1000.

The bus 1040 may be a single internal bus interconnect architecture and/or other bus or mesh architectures. While a single bus is illustrated, it is appreciated that the computer 1000 may communicate with various devices, logics, and peripherals using other busses (e.g., peripheral component interconnect express (PCIE), 1394, universal serial bus (USB), Ethernet). The bus 1040 can be types including, for example, a memory bus, a memory controller, a peripheral bus, an external bus, a crossbar switch, and/or a local bus.

The computer 1000 may interact with input/output devices via the input/output (I/O) interfaces 1070 including the interference reduction logic 1050 and the input/output ports 1030. Input/output devices may be, for example, a keyboard, a microphone, a pointing and selection device, cameras, video cards, displays, the disk 1060, the network devices 1099, and so on. The input/output ports 1030 may include, for example, serial ports, parallel ports, and USB ports.

The computer 1000 can operate in a network environment and thus may be connected to the network devices 1099 via the I/O interfaces 1070, and/or the I/O ports 1030. Through the network devices 1099, the computer 1000 may interact with a network. Through the network, the computer 1000 may be logically connected to remote computers. Networks with which the computer 1000 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method, comprising:
   negotiating wirelessly between a first device and a second device for a quiet interval, where the first device and the second device communicate wirelessly via a first network according to a first wireless protocol and are within a wireless area of a second network that communicates with a second wireless protocol; and
   controlling wireless transmission of data from at least one device on the first network by prohibiting transmissions during the quiet interval to create a reduced interference time period for wireless communications from the second network.

2. The method of claim 1, further comprising detecting that the second network has not transmitted data for a time period and where the quiet interval is negotiated responsive thereto.

3. The method of claim 1, where the first network is a Bluetooth network and the second network is a wireless local area network (WLAN).

4. The method of claim 1, further comprising storing the quiet interval as a transmission control parameter used to control the transmission of data from devices in the first network.

5. The method of claim 1, further comprising setting the quiet interval to repeat at a periodic rate and;
   prohibiting the transmissions from the first network periodically based in part on the periodic rate of the quiet interval.

6. The method of claim 1, further comprising:
   negotiating between a master and a slave for removal of the quiet interval; and
   removing the quiet interval so that the quiet interval does not repeat at the periodic rate.

7. The method of claim 1, where the negotiating and controlling are performed without communicating to a device from the second network.

8. The method of claim 1, where prohibiting transmissions during the quiet interval comprises delaying data packets and transmitting the data packets over an asynchronous connectionless (ACL) link in the first network after the quiet interval expires.

9. The method of claim 1, further comprising:
   determining a remaining time from a current time to a beginning boundary of the quiet interval;
   identifying one or more packets from a set of pending data packets having a size that will complete transmission within the remaining time; and
   rescheduling the pending data packets to transmit the identified one or more packets and delaying the transmission of other pending packets until after the quiet interval.

10. An apparatus, comprising:
    negotiation logic to control a wireless communication device to negotiate with a remote device for an asynchronous connectionless (ACL) link boundary associated with an ACL link, where the apparatus and the remote device wirelessly communicate via a wireless protocol; and
    control logic to control wireless communications from the apparatus via the wireless protocol by restricting the apparatus from transmitting data packets that extend across the ACL link boundary.

11. The apparatus of claim 10, further comprising:
    detection logic to detect when data has not been transmitted by a network in a time period, where the negotiation logic is to negotiate the ACL link boundary responsive to the network not transmitting data in the time period.

12. The apparatus of claim 10, where the negotiation logic is configured to negotiate that the ACL link boundary is to repeat at periodic time intervals.

13. The apparatus of claim 10, further comprising:
    a first wireless transceiver to transmit and receive data according to the wireless protocol; and
    a second wireless transceiver to transmit and receive data according to a second wireless protocol.

14. The apparatus of claim 10, where the apparatus is a dual transceiver chip comprising a Bluetooth transceiver that is compatible with the wireless protocol and a non-Bluetooth transceiver for communicating with a wireless local area network that is compatible with a different wireless protocol.

15. The apparatus of claim 10, where the negotiation logic is to negotiate with the remote device proactively before there is interference between communications of the wireless protocol and a second different wireless protocol.

16. The apparatus of claim 10, where the control logic is configured to generate a packet that reserves multiple time slots for transmission but includes minimum data where the packet completes a transmission in a transmission time in less than the multiple time slots.

17. A method, comprising:
    reducing interference between a Bluetooth network and a wireless local area network (WLAN) by:
      generating a packet with a minimal payload data;
      reserving multiple time slots in a Bluetooth wireless network for transmitting the packet, where the minimal payload data uses less than the multiple time slots reserved to be transmitted; and
      transmitting the packet in less time than the multiple time slots, where other Bluetooth devices are prohibited from transmitting data during the reserved multiple time slots thereby creating a transmission free time period for wireless communications from the WLAN.

18. The method of claim 17, where the minimal payload data of the packet is generated with one byte and uses less than one time slot from the reserved multiple time slots.

19. The method of claim 17, further comprising:
    delaying subsequent packets being transmitted in the Bluetooth network until a subsequent poll message is received from a Bluetooth master, where the WLAN transmits data without Bluetooth network interference for a time period between transmitting the packet and receiving the subsequent poll message.

20. The method of claim 17, where the packet is generated as a Bluetooth data high 5 (DH5) packet.

21. An apparatus, comprising:
    negotiation logic implemented in hardware configured for negotiating wirelessly between a first device and a second device for a quiet interval, where the first device and the second device communicate wirelessly via a first network according to a first wireless protocol and are within a wireless area of a second network that communicates with a second wireless protocol; and control logic implemented in hardware configured for controlling wireless transmission of data from at least one device on the first network by prohibiting transmissions during the quiet interval to create a reduced interference time period for wireless communications from the second network.

22. A method, comprising:

controlling, by an apparatus, a wireless communication device to negotiate with a remote device for an asynchronous connectionless (ACL) link boundary associated with an ACL link, where the apparatus and the remote device wirelessly communicate via a wireless protocol; and controlling, by the apparatus, wireless communications from the apparatus via the wireless protocol by restricting the apparatus from transmitting data packets that extend across the ACL link boundary.

23. An apparatus, comprising:

interference reduction logic implemented in at least hardware and configured to reduce interference between a Bluetooth network and a wireless local area network (WLAN) by:

generating a packet with a minimal payload data;

reserving multiple time slots in a Bluetooth wireless network for transmitting the packet, wherein the minimal payload data uses less than the multiple time slots reserved to be transmitted; and transmitting, via a transceiver, the packet in less time than the multiple time slots, wherein other Bluetooth devices are prohibited from transmitting data during the reserved multiple time slots to create a transmission free time period for wireless communications from the WLAN.

* * * * *